United States Patent
Balogh

(10) Patent No.: US 8,853,518 B2
(45) Date of Patent: Oct. 7, 2014

(54) SYSTEM EMPLOYING A THERMOELECTRIC DEVICE TO POWER AN ELECTRONIC CIRCUIT FROM HEAT GENERATED BY SEMICONDUCTOR DEVICES, AND METHOD OF POWERING A SYSTEM

(75) Inventor: Kenneth W. Balogh, Arden, NC (US)

(73) Assignee: Eaton Corporation, Cleveland, OH (US)

( * ) Notice: Subject to any disclaimer, the term of this patent is extended or adjusted under 35 U.S.C. 154(b) by 136 days.

(21) Appl. No.: 13/229,068

(22) Filed: Sep. 9, 2011

(65) Prior Publication Data

US 2013/0062945 A1 Mar. 14, 2013

(51) Int. Cl.
*H01L 35/30* (2006.01)
*H02J 1/10* (2006.01)

(52) U.S. Cl.
CPC ..................... *H02J 1/108* (2013.01)
USPC ....................................... 136/205

(58) Field of Classification Search
USPC ....................................... 136/205
See application file for complete search history.

(56) References Cited

U.S. PATENT DOCUMENTS

| | | | | |
|---|---|---|---|---|
| 5,576,512 | A * | 11/1996 | Doke | 136/203 |
| 5,682,748 | A * | 11/1997 | DeVilbiss et al. | 62/3.7 |
| 6,521,991 | B1 * | 2/2003 | Yamada et al. | 257/712 |
| 7,834,579 | B2 | 11/2010 | Nojima | |
| 2003/0136439 | A1 * | 7/2003 | Felisari | 136/219 |
| 2005/0078451 | A1 * | 4/2005 | Sauciuc et al. | 361/700 |
| 2008/0029624 | A1 | 2/2008 | Shkolnikov et al. | |
| 2008/0072948 | A1 * | 3/2008 | McGilvray et al. | 136/230 |
| 2008/0184710 | A1 * | 8/2008 | DeVilbiss | 62/3.2 |
| 2009/0260668 | A1 * | 10/2009 | Maeda | 136/205 |
| 2011/0215762 | A1 * | 9/2011 | Hasebe et al. | 320/134 |

OTHER PUBLICATIONS

Lella et al "IGBTs for 3-level inverters", Sep. 2008.*

* cited by examiner

*Primary Examiner* — Jeffrey T Barton
*Assistant Examiner* — Uyen Tran
(74) *Attorney, Agent, or Firm* — Eckert Seamans Cherin & Mellott, LLC; Kirk D. Houser

(57) ABSTRACT

A system includes a plurality of semiconductor devices; an electronic circuit operatively associated with the semiconductor devices; a thermoelectric device structured to provide power to power the electronic circuit from heat generated by the semiconductor devices; a power supply structured to provide power to power the electronic circuit; a number of sensors structured to sense at least one characteristic of the semiconductor devices or the thermoelectric device; and a processor cooperating with the number of sensors to provide power to power the electronic circuit from at least one of the thermoelectric device and the power supply.

4 Claims, 3 Drawing Sheets

US 8,853,518 B2

SYSTEM EMPLOYING A THERMOELECTRIC DEVICE TO POWER AN ELECTRONIC CIRCUIT FROM HEAT GENERATED BY SEMICONDUCTOR DEVICES, AND METHOD OF POWERING A SYSTEM

BACKGROUND

1. Field

The disclosed concept pertains generally to systems employing semiconductor devices and, more particularly, to systems, such as, for example, power systems employing semiconductor devices and an electronic circuit operatively associated with the semiconductor devices to control or monitor such devices. The disclosed concept also pertains to methods of powering a system.

2. Background Information

Induction motor drives, also called alternating current (AC) drives, are used to control the speed and torque of multi-phase induction motors, which for a long time have been the workhorse of the industry.

AC drives can be divided into two categories: low-voltage and medium-voltage. The low-voltage AC drives are widely used and cover the 0 VAC to about 600 VAC range. Low-voltage AC drives are manufactured by almost five hundred companies around the world. Medium-voltage AC drives cover input line voltages above about 660 VAC and up to about 15,000 VAC. Only about a half-dozen known companies design and produce medium-voltage AC drives. High-voltage AC drives cover voltages of about 15,000 VAC and higher, but are very uncommon compared to low-voltage and medium-voltage AC drives. Recently, the auto industry and some other special applications providing low output voltage harmonics are considering the use of multi-level inverter bridges for low-voltage motors.

Until recently, power semiconductor switches were rated at a maximum of 1,700 V, which has allowed the low-voltage three-phase AC drives to use a six-switch inverter bridge. Today, state-of-the-art semiconductor switches are rated at 2,500 V, 3,300 V, 4,500 V, 6,500 V and can be used in a two-level, six-switch inverter bridge having up to a 2,000 VAC input. Above 2,000 VAC, the inverter bridge employs a greater number of power semiconductor switches connected in series. The most popular inverter topology for three-phase, medium-voltage induction motors of up to 4,000 V is a three-level, twelve-switch inverter bridge.

The number of levels in an inverter bridge defines the number of direct current (DC) voltage steps that are employed by the inverter bridge in order to achieve a certain voltage level in its output. Because power semiconductor switches have limited voltage capability, the total DC bus voltage of an inverter bridge is divided into a number of voltage steps, such that each voltage step can be handled by one power switch.

In a conventional two-level AC drive, three-phase AC power, after passing through an optional input line reactor, is rectified by a rectifier and capacitor to form a two-level DC bus. Depending on the design approach, input harmonics on the DC bus may be further reduced by a DC reactor. The two-level DC bus voltage is applied across a six-switch inverter bridge which produces a two-level PWM voltage output. The six switches are divided into three branches with two switches each. A controller controls each switch via the control terminals of each switch. A three-phase motor has a phase connection derived from the middle point between the two switches of a branch, and the three branches produce three phases which collectively drive the motor. The two levels of the DC bus constitute a positive bus and a negative bus. The top switch of each branch is connected to the positive bus and the bottom switch of each branch is tied to the negative bus. The two switches in a branch are in series and therefore cannot be turned-on at the same time without causing a short-circuit. In order to prevent a short-circuit, switch delay times are taken into consideration by the controller. The top switch needs to turn-off before the bottom one turns-on, and vice-versa. Each of the switches has to be able to handle the full voltage between the positive and negative busses.

In comparison to the two-level drive, in a three-level AC drive, the DC bus has three voltage levels (relatively labeled positive, neutral and negative), and the inverter bridge has twelve switches. The switches are divided into three equal branches, each branch connecting to one phase of the three-phase motor. Thus, each branch has four switches in series, and each connection to the motor is derived from a middle point.

In multi-level inverters, a power supply is employed to power the logic to control each semiconductor device. As the number of levels increases, more power supplies are needed to power the semiconductor devices. However, as the semiconductor devices operate, they create energy losses in the form of heat. These losses can be, for example and without limitation, conduction losses, switching losses or internal losses causes by internal resistance of the semiconductor devices.

There is room for improvement in systems employing an electronic circuit operatively associated with semiconductor devices.

There is also room for improvement in methods of powering a system including a plurality of semiconductor devices and an electronic circuit operatively associated with the semiconductor devices.

SUMMARY

These needs and others are met by embodiments of the disclosed concept, which re-claim wasted heat by employing a thermoelectric device that powers an electronic circuit operatively associated with semiconductor devices of, for example and without limitation, a multi-level current or voltage source inverter. For example, this allows the electronic circuit of the example multi-level inverter to be powered by employing energy that otherwise would be wasted.

A power supply is employed to power the electronic circuit until sufficient heat is generated to create enough power from the thermoelectric device. After this occurs, the power supply may be disabled. A processor, such as for example a controller, may determine when to disable the power supply. The controller may also turn on the power supply when the example multi-level inverter is cooling down and can no longer sustain the power requirements of the electronic circuit.

In accordance with one aspect of the disclosed concept, a system comprises: a plurality of semiconductor devices; an electronic circuit operatively associated with the semiconductor devices; a thermoelectric device structured to provide power to power the electronic circuit from heat generated by the semiconductor devices; a power supply structured to provide power to power the electronic circuit; and a circuit structured to provide power to power the electronic circuit from at least one of the thermoelectric device and the power supply.

The circuit may comprise a number of sensors structured to sense at least one characteristic of the semiconductor devices or the thermoelectric device, a plurality of switches structured to enable or disable power from the thermoelectric device and the power supply, and a processor cooperating with the number of sensors and the plurality of switches to provide power to power the electronic circuit from at least one of the thermoelectric device and the power supply.

The processor may be structured to monitor ambient temperature in order to determine when to enable or disable the power supply.

The power supply may power the electronic circuit until a temperature from the heat generated by the semiconductor devices is greater than a predetermined value; and the processor may be structured to monitor the temperature and responsively disable the power supply.

The processor may further be structured to monitor the temperature and responsively enable the power supply when the semiconductor devices cool down and can no longer provide sufficient heat to the thermoelectric device to power the electronic circuit.

The processor may be structured to enable and disable at least one of the thermoelectric device and the power supply.

The processor may be structured to monitor a temperature operatively associated with the heat generated by the semiconductor devices.

As another aspect of the disclosed concept, a method of powering a system comprises: employing a plurality of semiconductor devices; operatively associating an electronic circuit with the semiconductor devices; providing power from a thermoelectric device to power the electronic circuit from heat generated by the semiconductor devices; providing a power supply to power the electronic circuit; and providing power to power the electronic circuit from at least one of the thermoelectric device and the power supply.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the term "processor" shall mean a programmable analog and/or digital device that can store, retrieve, and process data; a controller; a computer; a workstation; a personal computer; a microprocessor; a microcontroller; a microcomputer; a central processing unit; a mainframe computer; a mini-computer; a server; a networked processor; or any suitable processing or logic device or apparatus.

As employed herein, the term "inverter" shall mean an electrical device that converts direct current (DC) to alternating current (AC). The converted AC may be at any suitable voltage and frequency. This can be accomplished, for example and without limitation, with the use of transformers and switching and control circuits or another inverter. Inverters can be, for example and without limitation, single-level, multi-level, voltage source, or current source.

As employed herein, the term "drive controller" shall mean an electrical device such as, for example and without limitation, a two-level AC drive inverter bridge, that converts AC to DC to AC.

A thermoelectric device (e.g., without limitation, a thermoelectric power generator) is a solid-state device that converts heat directly into electricity. For example, the thermoelectric device is based on thermoelectric effects involving interactions between the flow of heat and of electricity through solid bodies. A heat source provides a relatively high temperature, and the heat flows through a thermoelectric converter to a heat sink, which is maintained at a temperature below that of a heat source. The temperature differential across the thermoelectric converter produces direct current (DC) to a load having a terminal voltage and a terminal current. There is no intermediate energy conversion process. The amount of electrical power generated is given by the terminal voltage times the terminal current.

As employed herein, the term "two-level inverter" shall mean an electrical device that converts an alternating current to a direct current to an alternating current. A simple two-level inverter has two levels, although multi-level inverters can employ any plural number of levels.

The disclosed concept is described in association with a power system, although the disclosed concept is applicable to a wide range of systems employing semiconductor devices and an electronic circuit operatively associated with the semiconductor devices.

Figure 1:
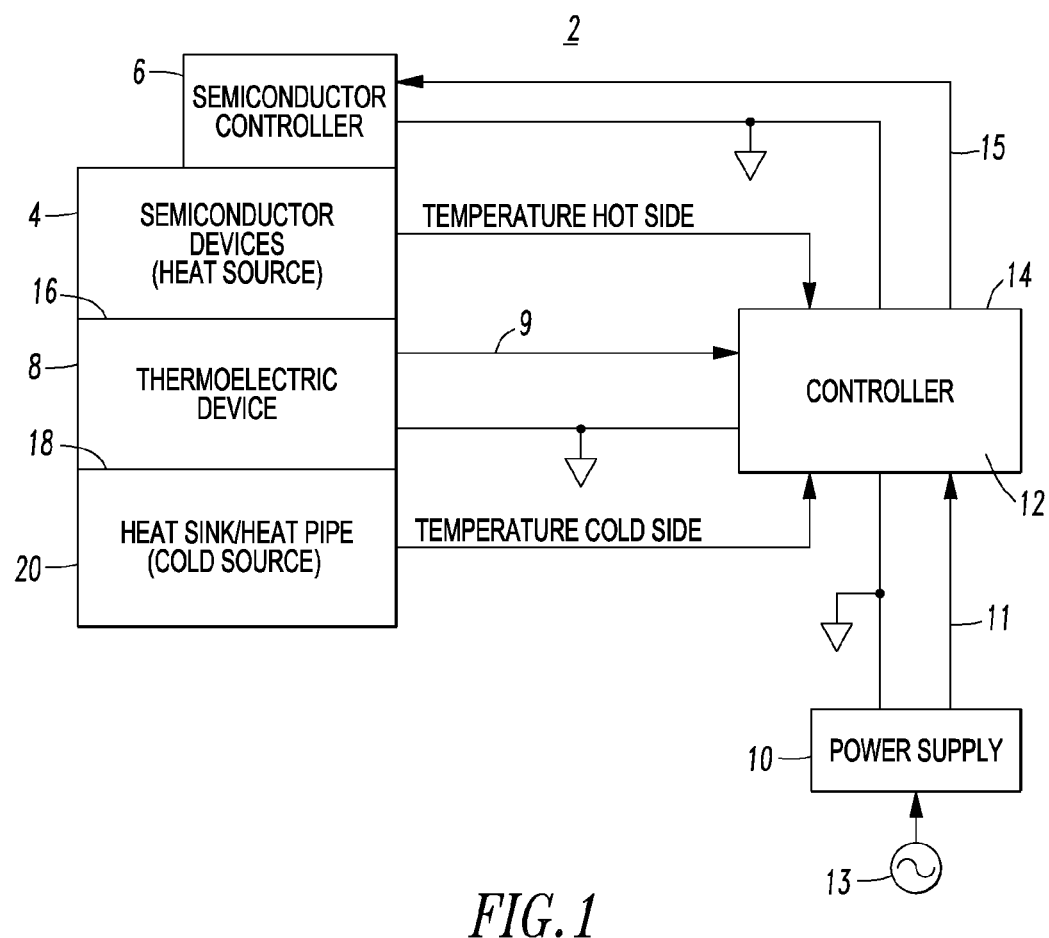
FIG. 1 is a block diagram of a system in accordance with embodiments of the disclosed concept.

Referring to FIG. 1, a system 2 (e.g., without limitation, an inverter; a multi-level inverter; a drive controller) includes a plurality of semiconductor devices 4, which function as a heat source, an electronic circuit, such as the example semiconductor controller 6, operatively associated with (e.g., without limitation, structured to control and/or monitor) the semiconductor devices 4, a thermoelectric device 8 structured to provide power 9 to power the semiconductor controller 6 from heat generated by the semiconductor devices 4, and a power supply 10 structured to provide power 11 to power the semiconductor controller 6. A number of sensors 12 (e.g., without limitation, temperature; current; voltage) are structured to sense at least one characteristic (e.g., without limitation, temperature; current; voltage) of the semiconductor devices 4 or the thermoelectric device 8. A circuit, such as the example controller 14, provides power 15 to power the semiconductor controller 6 from at least one of the thermoelectric device 8 and the power supply 10.

The semiconductor devices 4 can be configured as, for example and without limitation, a two-level inverter or an inverter having at least three levels. The semiconductor devices 4 can be, for example and without limitation, a plurality of IGBTs, a plurality of transistors, or other suitable semiconductor electronic components.

As will be discussed in connection with FIGS. 2 and 3, the example controller 14 can perform various functions, such as for example and without limitation: (1) monitoring the power 9 output by the thermoelectric device 8; (2) enabling and disabling the thermoelectric device 8 and/or the power supply 10; (3) voltage monitoring; (4) current monitoring; and (5) temperature monitoring.

The power supply 10 can receive power from an external power source 13. The external power source can be any suitable voltage and/or current source (e.g., without limitation, an alternating current (AC) to direct current (DC) power supply; 15 VDC; several amperes) that is structured to power the example semiconductor controller 6.

The thermoelectric device 8 includes a first portion 16 that receives a heat source from the semiconductor devices 4 and a second portion 18 that receives a cold source 20 (e.g., without limitation, a heat sink; a heat pipe).

Although FIG. 1 shows one thermoelectric device 8, it will be appreciated that a plurality of thermoelectric devices (not shown) can be connected to the example controller 14.

Figure 2:
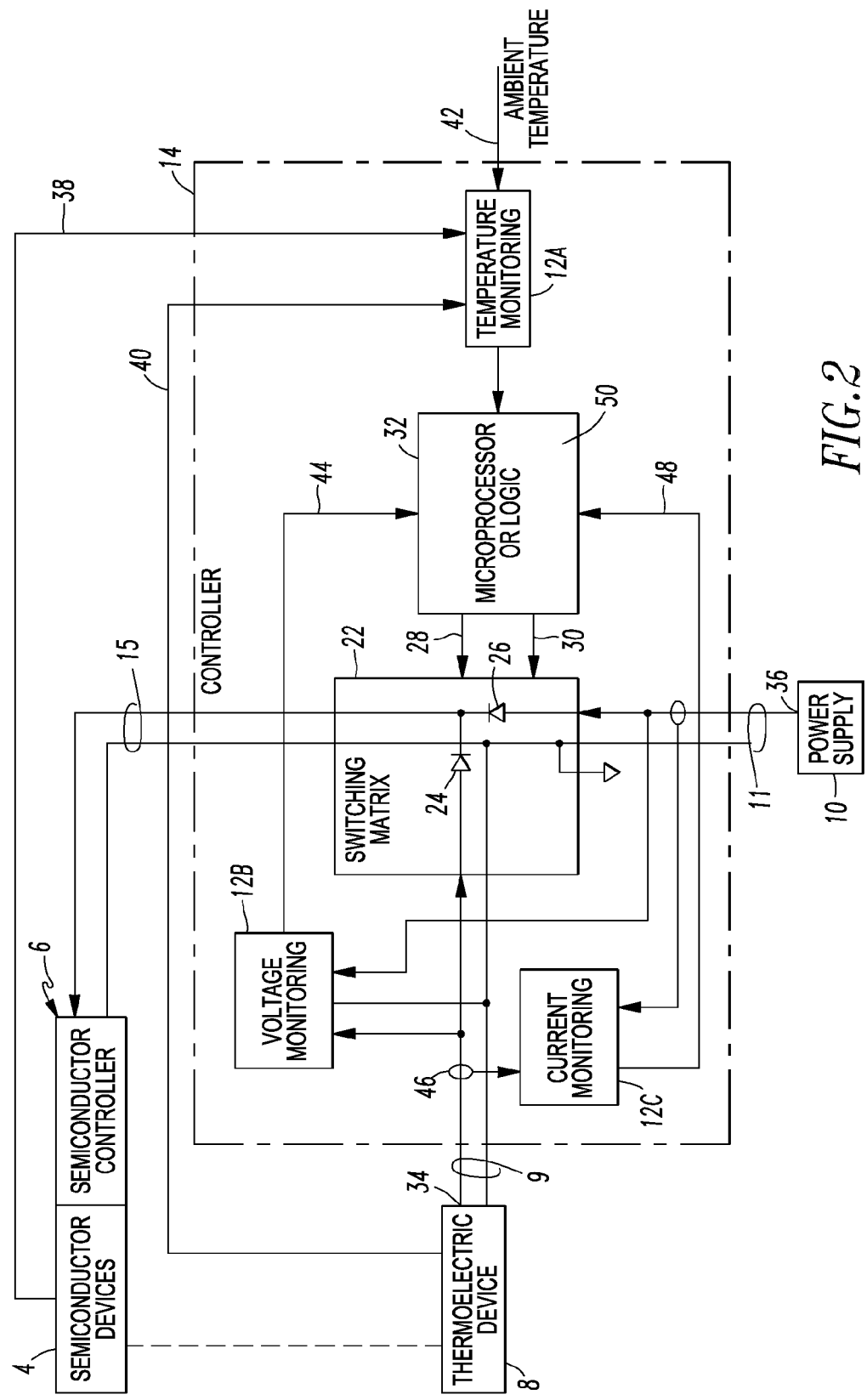
FIG. 2 is a block diagram of the controller of FIG. 1.

FIG. 2 shows the example controller 14 of FIG. 1. The number of sensors 12 can include, for example and without limitation, a number of temperature sensors 12A, a number of voltage sensors 12B and a number of current sensors 12C. In this example, a switching matrix 22 auctioneers or switches power 9,11 from the thermoelectric device 8 and the power supply 10 by using example auctioneering diodes 24,26 to share between the different power sources and to output power 15 to the example semiconductor controller 6. Although auctioneering diodes 24,26 are shown, suitable switching device(s) (e.g., without limitation, a transistor; a MOSFET; a relay; an IGBT) can be employed to enable and disable the thermoelectric device 8 and/or the power supply 10. In that example, the switching devices (not shown) are controlled by signals 28,30 from a microprocessor or other suitable logic 32.

As shown in FIG. 2, the example controller 14 includes the first auctioneering diode 24 for a first power output 34 from the thermoelectric device 8 and the second auctioneering diode 26 for a second power output 36 from the power supply 10. The first auctioneering diode 24 includes an anode electrically connected to the first power output 34 and a first cathode. The second auctioneering diode 26 includes an anode electrically connected to the second power output 36 and a second cathode. The first cathode is electrically connected to the second cathode and to the example semiconductor controller 6.

The temperature monitoring 12A can include temperature sensors to sense the hot side temperature 38 from the semiconductor devices 4, the cold side temperature 40 from the thermoelectric device 8, and the ambient temperature 42. The voltage monitoring 12B inputs voltage and ground from the output 34 of the thermoelectric device 8 and provides a voltage value 44 to the microprocessor or logic 32. The current monitoring 12C employs a current sensor 46 (e.g., without limitation, sensing a voltage across a resistor of known resistance; a current transformer; any suitable current sensing device) and provides a current value 48 to the microprocessor or logic 32. The values 46,48 can be multiplied by the microprocessor or logic 32 to determine the power 9 from the thermoelectric device 8.

Figure 3:
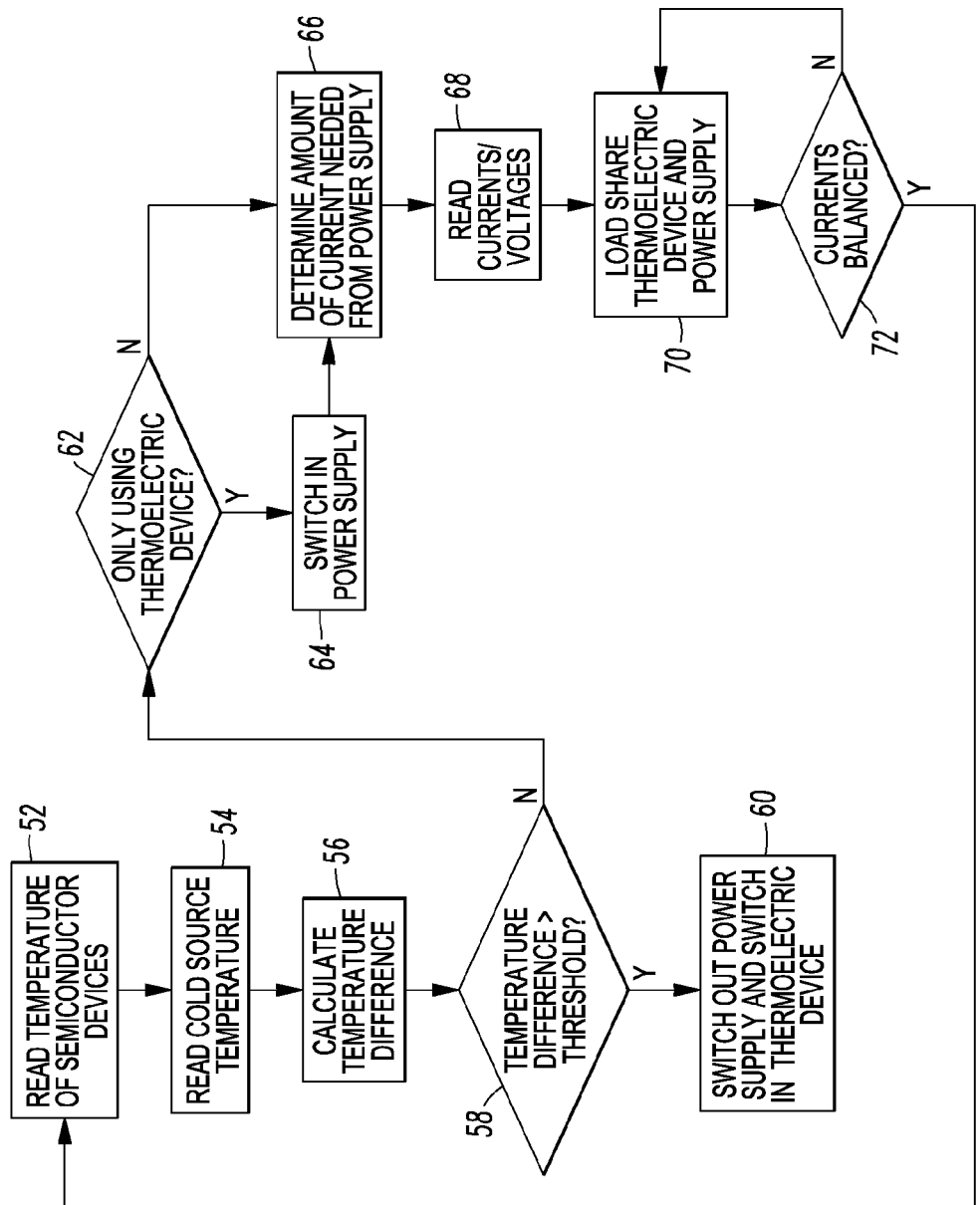
FIG. 3 is a flowchart of the controller of FIG. 1.

FIG. 3 shows a routine 50 employed by the microprocessor 32 of FIG. 2. First, at 52, the routine 50 reads the temperature 38 of the semiconductor devices 4. This is the temperature operatively associated with the heat generated by the semiconductor devices 4. Next, at 54, the temperature 40 of the cold source 20 is read. Then, at 56, a temperature difference is calculated from the heat source temperature 38 less the cold source temperature 40. Next, at 58, if the temperature difference is greater than a suitable threshold (e.g., without limitation, twenty degrees; any suitable temperature difference threshold), then the power supply 10 is disabled and the thermoelectric device 8 is enabled, for example, by employing the switching matrix 22 as controlled by the signals 28,30. In this manner, the power supply 10 initially powers the semiconductor controller 6 until sufficient heat is generated to create enough power 9 from the thermoelectric device 8. After this occurs, at 60, the power supply 10 is disabled with the signal 30 (e.g., by a suitable switch of the switching matrix 22) and the thermoelectric device 8 is enabled with the signal 28 (e.g., by another suitable switch of the switching matrix 22). Alternatively, the signal 30 may control an enable/disable input of the power supply 10. After 60, step 52 is repeated.

Preferably, the example controller 14 monitors two temperatures, one on the hot side 16 and one on the cold side 18, for example, under the semiconductor devices 4 and on the heat sink 20 under the thermoelectric device 8. Alternatively, temperatures operatively associated with the semiconductor devices 4 could be employed.

If the test failed at 58 and insufficient heat is generated to create enough power 9 from the thermoelectric device 8, then it is determined, at 62, if only the thermoelectric device 8 was in use. If so, then at 64, the power supply 10 is enabled with the signal 30 (e.g., by a suitable switch of the switching matrix 22). Otherwise, if it is determined, at 62, that the power supply 10 was also in use, or after 64, then, at 66, the amount of current needed from the power supply 10 is determined For example, this can be based on a number of different factors, such as, for example and without limitation, the number of gate drivers (not shown) of the semiconductor controller 6 and how often the gate drivers are being turned on/off. The microprocessor or logic 32 of the controller 14 can calculate this current by employing suitable logic. Next, at 68, the voltage value 44 and the current value 48 are read. This also provides an indication of whether there is sufficient or insufficient power 9 being output by the thermoelectric device 8.

Then, at 70, the thermoelectric device 8 and the power supply 10 are adjusted for load sharing. For example, if the power supply 10 has a number of control inputs to reduce its output voltage and/or disable its output, those can be employed in the event that there is sufficient power 9 output by the thermoelectric device 8. Otherwise, if there is insufficient power 9 output by the thermoelectric device 8, then the number of control inputs of the power supply 10 can be employed to enable its output and/or increase its output voltage. Also, after the voltage value 44 and the current value 48 are at the appropriate levels, the thermoelectric device 8 is enabled, which reduces the demand for the power 11 from the power supply 10. Eventually, the voltage of the power supply 10 can be reduced, completely removed or disabled by employing its number of control inputs or by employing the switching matrix 22.

The voltage monitoring 12B and the current monitoring 12C can optionally determine and report voltage and current values of the power supply 10 to the microprocessor or logic 32. At 72, it is determined if the currents from the thermoelectric device 8 and the power supply 10 are balanced, such that the thermoelectric device 8 is carrying as much of the power 15 to the semiconductor controller 6 as possible. If not, then step 70 is repeated. Otherwise, execution resumes at step 52.

Alternatively, when used with the example auctioneering diodes 24,26, the currents from the thermoelectric device 8 and the power supply 10 can also balance each other.

Also, later at 64, the power supply 10 is enabled when the thermoelectric device 8 is not capable of providing sufficient power 9. This occurs when, for example, the semiconductor devices 4 are cooling down and can no longer sustain the power requirements of the semiconductor controller 6. Here, the controller 14 can enable the power supply 10 and, later, disable the thermoelectric device 8. Thus, by monitoring the temperatures 38,40, the controller 14 can responsively enable the power supply 10 when the semiconductor devices 4 cool down and can no longer provide sufficient heat to the thermoelectric device 8 to power the semiconductor controller 6. Hence, the controller 14 can enable and disable at least one of the thermoelectric device 8 and the power supply 10.

As shown in FIG. 2, the controller 14 may optionally be structured to monitor the ambient temperature 42 in order to determine an optimal time to remove the power supply 10.

For example, if the ambient temperature 42 is hot enough, then the power supply 10 can be disabled relatively sooner. Otherwise, if the ambient temperature 42 is relatively colder, then the power supply 10 can be disabled relatively later. This is another data point that can be employed to determine when to optimally disable the power supply 10.

The example controller routine 50 monitors various functions. The enabling and disabling of the thermoelectric device 8 can be controlled by software in order that various different types of the semiconductor devices 4 (e.g., without limitation, IGBTs; transistors) can be employed.

As the semiconductor devices 4 heat up, there is a temperature difference between the cold source 20 (e.g., heat sink) and the heat source, which is the semiconductor devices 4. This temperature difference causes each side 16,18 of the thermoelectric device 8 to be at different temperatures. This difference in temperature causes the thermoelectric device 8 to generate power 9. The example controller 14 monitors the thermoelectric device 8 (or each individual thermoelectric device (not shown)) and enables it or disables it from powering the semiconductor controller 6.

Later, the power supply 10 is enabled when the thermoelectric device 8 is not capable of providing sufficient power 9. Hence, the controller 14 enables the thermoelectric device 8 or the power supply 10 when needed. Alternatively, the controller 14 can employ the auctioneering diodes 24,26 to share between the different powers 9,11.

The example controller 14 can completely remove the power supply 10 from the system 2, thereby allowing the semiconductor controller 6 to be powered solely from the thermoelectric device 8 in response to the waste heat. In this manner, the system 2 self-powers the semiconductor controller 6. The controller 14 can also employ the temperature monitoring 12A to measure the semiconductor temperature 38 in order to aid in the switchover from the power supply 10 to the thermoelectric device 8.

The disclosed concept reduces power consumption from a number of power supplies employed to power a power system, such as a multi-level inverter, by employing otherwise wasted heat energy.

Although an example routine 50 is shown, a relatively more simple routine can employ steps 52,54,56,58,60,62,64 and the auctioneering diodes 24,26. In this manner, the power supply 10 powers the semiconductor controller 6 until the temperature 38 from the heat generated by the semiconductor devices 4 is greater than a predetermined value. Alternatively, in place of the temperatures 38,40, the current value 48 and/or the voltage value 44 can be employed to determine if only the thermoelectric device 8 can power the semiconductor controller 6.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A system comprising:
   a plurality of semiconductor devices;
   an electronic circuit structured to control and/or monitor said semiconductor devices;
   a thermoelectric power generator structured to provide power to power said electronic circuit from heat generated by said semiconductor devices;
   a power supply structured to provide power to power said electronic circuit; and
   a circuit structured to provide power to power said electronic circuit from at least one of said thermoelectric power generator and said power supply,
   wherein said circuit comprises a number of sensors structured to sense at least one characteristic of said semiconductor devices or said thermoelectric power generator, a plurality of switches structured to enable or disable power from said thermoelectric power generator and said power supply, and a processor cooperating with said number of sensors and said plurality of switches to provide the power to power said electronic circuit from at least one of said thermoelectric power generator and said power supply;
   wherein said power supply powers said electronic circuit until a temperature from said heat generated by said semiconductor devices is greater than a predetermined value; and wherein said processor is structured to monitor said temperature and responsively disable said power supply and enable said thermoelectric power generator.

2. The system of claim 1 wherein said processor is further structured to monitor said temperature and responsively enable said power supply and disable said thermoelectric power generator when said semiconductor devices cool down and can no longer provide sufficient heat to said thermoelectric power generator to power said electronic circuit.

3. A system comprising:
   a plurality of semiconductor devices;
   an electronic circuit structured to control and/or monitor said semiconductor devices;
   a thermoelectric power generator structured to provide power to power said electronic circuit from heat generated by said semiconductor devices;
   a power supply structured to provide power to power said electronic circuit; and
   a circuit structured to provide power to power said electronic circuit from at least one of said thermoelectric power generator and said power supply,
   wherein said circuit comprises a first auctioneering diode for a first power output from said thermoelectric power generator and a second auctioneering diode for a second power output from said power supply;
   wherein said first auctioneering diode includes an anode electrically connected to the first power output from said thermoelectric power generator and a first cathode; wherein said second auctioneering diode includes an anode electrically connected to the second power output from said power supply and a second cathode; and wherein said first cathode is directly electrically connected to said second cathode and to said electronic circuit.

4. A system comprising:
   a plurality of semiconductor devices;
   an electronic circuit structured to control and/or monitor said semiconductor devices;
   a thermoelectric power generator structured to provide power to power said electronic circuit from heat generated by said semiconductor devices;
   a power supply structured to provide power to power said electronic circuit; and
   a circuit structured to provide power to power said electronic circuit from at least one of said thermoelectric power generator and said power supply,
   wherein said circuit comprises a number of sensors structured to sense at least one characteristic of said semiconductor devices or said thermoelectric power generator, a plurality of switches structured to enable or disable power from said thermoelectric power generator and said power supply, and a processor cooperating with said number of sensors and said plurality of switches to provide the power to power said electronic circuit from at least one of said thermoelectric power generator and said power supply; and wherein said processor is structured to monitor ambient temperature; and wherein said processor is further structured, when the monitored ambient temperature is at least a first temperature, to disable said power supply sooner than when the monitored ambient temperature is at a lower second temperature.

* * * * *